Figure 8:
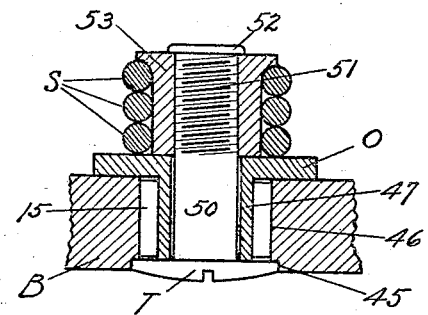

E. J. MARTEL.
MOUNTING FOR EYEGLASSES.
APPLICATION FILED JULY 11, 1918.
1,291,060.
Patented Jan. 14, 1919.
2 SHEETS—SHEET 1.
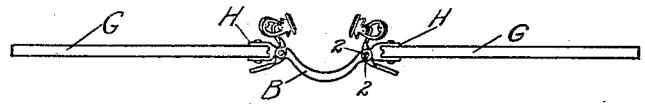
FIG. 1
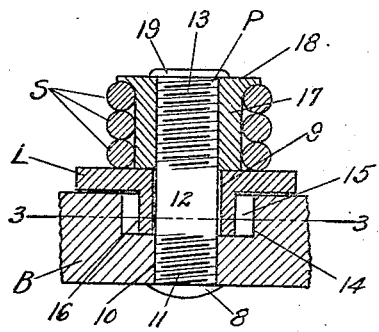
FIG. 2
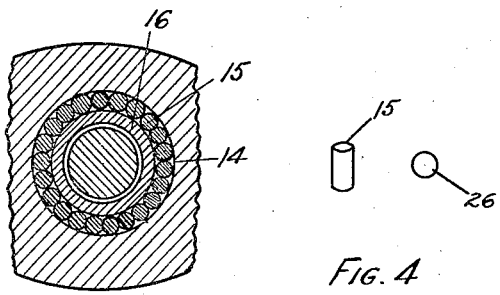
FIG. 3
FIG. 4
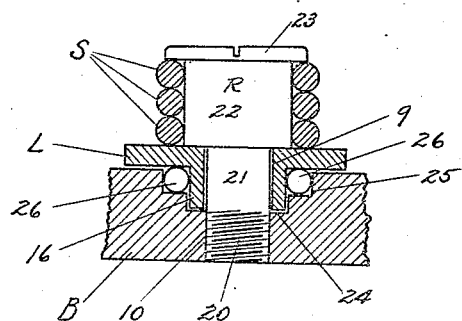
FIG. 5
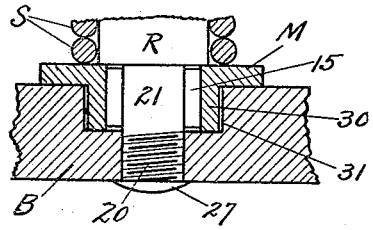
FIG. 6
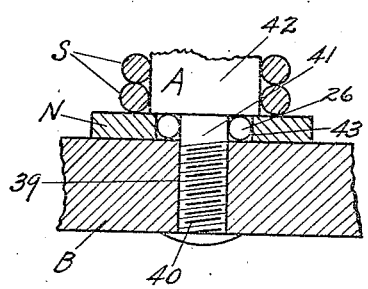
FIG. 7
Inventor
Edgar J. Martel
by Gardner W. Pearson
attorney

E. J. MARTEL.
MOUNTING FOR EYEGLASSES.
APPLICATION FILED JULY 11, 1918.

1,291,060.

Patented Jan. 14, 1919.
2 SHEETS—SHEET 2.

Inventor
Edgar J. Martel
by Gardner W. Pearson
attorney

UNITED STATES PATENT OFFICE.

EDGAR J. MARTEL, OF LACONIA, NEW HAMPSHIRE.

MOUNTING FOR EYEGLASSES.

1,291,060.

Specification of Letters Patent.   Patented Jan. 14, 1919.

Application filed July 11, 1918. Serial No. 244,388.

*To all whom it may concern:*

Be it known that I, EDGAR J. MARTEL, of Laconia, in the county of Belknap and State of New Hampshire, have invented certain new and useful Improvements in Mountings for Eyeglasses, of which the following is a specification.

This invention relates to the type of eyeglass in which a substantially rigid bridge connects the lenses and rests upon the nose and to this bridge are pivoted the levers of what are known as finger pieces.

This invention is of the type shown in my application for patent on eyeglass mounting, filed February 15, 1918, Serial No. 217,399.

The present invention is intended to provide roller-bearings or ball-bearings of the type consisting of a plurality of rollable members arranged in annular form to reduce the friction and therefore the wear of the parts.

Preferably such rollable members are located in the bridge, which is generally more solid and in which there is more room, but they can be arranged to extend from the bridge up through the finger piece lever or between a pin or upward extension of the bridge and the finger piece lever.

Heretofore it has not been considered possible to provide roller-bearings for the finger piece type of eyeglasses on account of the small size of the parts, but with my arrangement, such bearings are perfectly practical.

Figure 1 is a plan view of a pair of eyeglasses with finger piece levers embodying my invention. Fig. 2 is a section on line 2—2 of Fig. 1, very much enlarged, showing my preferred form of mounting. Fig. 3 is a section on line 3—3 of Fig. 2. Fig. 4 shows, in perspective, two types of rollable bearings. Figs. 5, 6, 7, 8, 9 and 10 are sectional views similar to Fig. 2 showing different applications of my rollable bearings to eyeglass mountings. Fig. 11 is a perspective view of the type of rollable member shown in Fig. 10.

G, G represent the lenses, H, H represent the lens clamps which are connected together by the bridge B.

In all the views, B represents the bridge, and S represents the returning spring of well known type.

In Figs. 2 and 3, I show a pivot hole 14 countersunk in bridge B and in the center of this a hole 10 which extends through the bridge and is threaded to receive the threaded end 11 of a retaining member shown as a pin P. As shown at 12, the middle part of pin P is smooth, and the upper end at 13 is threaded to receive the threaded nut 17 having at its upper end an annular rim 18 to hold in place spring S, as shown.

The finger piece lever L has a downwardly depending tubular extension forming a pivot member 16 through which and through the lever extends a hole 9 which is preferably of sufficient size so that the smooth part 12 of pin P will be out of contact therewith.

Pin P is first screwed in place in bridge B, after which a plurality of rollable members 15 are put in place around the rim of hole 14, and then finger piece lever L and tubular extension 16 are passed over pin P and downward until tubular extension 16 bears against members 15. Members 15 can be held in position while assembling by the use of a little oil or similar substance.

Spring S and nut 17 are then put in place and the other end of pin P is upset at 19 to prevent the parts from getting out of position. Preferably the lower end of pin P is upset at 8.

In Fig. 4 is shown a rollable member 15 of cylindrical form and at 26 is also shown a rollable member of spherical form of the usual ball type for ball-bearings.

In Fig. 5, bridge B is bored with a central pin hole 10 threaded to receive the shank 20 of retaining pin R, and with a somewhat larger hole 24 to permit the pivot member shown as tubular extension 16 of lever L to enter, and a still larger ball retaining or pivot hole 25 to receive the spherical balls 26.

The pin R has a threaded shank 20, a smooth shank 21, which is preferably slightly smaller than hole 9 through lever L, and an annular shoulder 22, together with a cap 23 to hold in place the spring S. The ball-bearings 26 preferably bear on the outside of 16 and the underside of the finger piece lever L.

In Fig. 6, I show a pin R similar to that shown in Fig. 5, but bridge B is counterbored with a single bearing hole 31 similar to 14. The tubular extension 30 of finger piece lever M, however, is of larger diameter and there is sufficient clearance between it and the smooth shank 21 of pin R to permit the rollable members in the form of cylinders 15 to be inserted between. The bearing in this case is between the inside of the tubular extension of the finger piece lever and the retaining pin, instead of between the outside of the tubular extension and the inside of the hole in the bridge.

As pin R is substantially rigid with reference to the bridge B, it may be regarded as a part thereof, and the rollable members 15 may therefore be considered as forming a bearing between the bridge and the finger piece lever. The pin also serves the purpose of retaining the parts in place and may be upset at 27 if desired.

In Fig. 7, I show a bridge B to which is detachably attached the retaining pin A. As shown, pin A is attached to bridge B by having its threaded end 40 screwed into threaded hole 39 therein.

The part 41 of its shank is unthreaded and smooth, while the upper part forms an annular shoulder 42.

The finger piece lever N is shown as being bored with a hole 43, which is of sufficient size to permit the rollable members, shown as balls 26, to be inserted in it to bear against shank 41 and the bottom part of shoulder 42.

In this case also the retaining pin A may be regarded as a part of bridge B, and the rollable members 26 as lying between the bridge and the finger piece lever and serving as a bearing therefor.

In Fig. 8, I show a finger piece lever O to which is fixed a tubular extension forming a pivot member 47, and in the bridge I bore the hole 45 to receive the head of retaining pin T, and the hole 46, which is enough larger in diameter than extension 47 to permit the insertion of rollable members 15, which are shown as of cylindrical form.

Pin T has smooth shank 50 which is smaller than the hole through lever O and extension 47, and has a threaded end 51 on which is screwed flanged nut 53 which holds the spring S in position. The end of pin T is shown as upset at 52 to keep the parts from unthreading.

Figure 9:
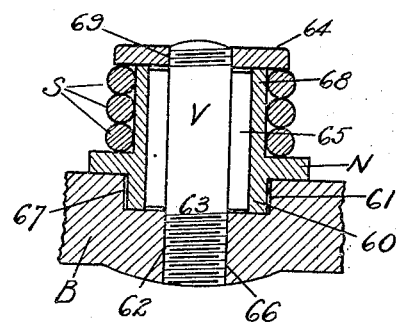

In Fig. 9, I have shown the bridge B with a circular or annular recess 61 which extends into but not through it. In the center of this recess, I locate the retaining pin V which is shown as passing into threaded hole 62 extending through bridge B being threaded at 66 for that purpose.

Its middle portion 63 is smooth and at its upper end 69 it is threaded to receive nut 64. This pin of course may be shrunk or soldered to bridge B and may be regarded as a part thereof.

The lever N has an upwardly extending tubular extension 68, and a downwardly extending tubular extension 60, the latter being of such size as to fit loosely in annular recess 61. The hole through lever N and extensions 68 and 60 is larger than the smooth part 63 of pin V, and permits the introduction of rollable members 65 arranged in annular form to serve as a bearing for the lever.

The spring S is held in place on extension 68 between lever N and nut 64.

Figure 10:
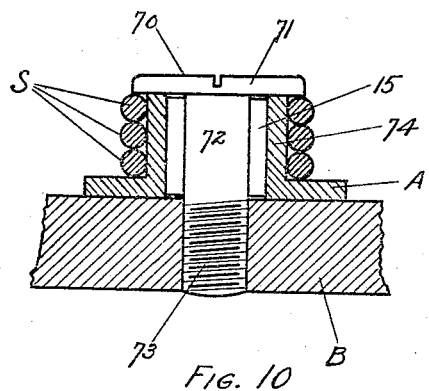
Figure 11:
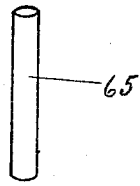

In Fig. 10, there is no pivot hole, such as 14, 25, 46, or annular recess such as 61, bored in the bridge B, but the pin 70, having a head 71, a smooth shank 72, and threaded shank 73, when in place, serves not only as a means for holding the parts in revoluble relation but may also be regarded as a part of the bridge. In this construction, the lever A has an upwardly extending tubular extension 74 of sufficient size so that the rollable members 15 can be inserted between it and the smooth shank 72, thus serving as a bearing between the lever and the bridge. Pin 71 should be large enough to hold all the parts, including spring S, in position.

In all my constructions the rollable members rest either between the finger piece lever and the bridge itself, or between the finger piece lever and a retaining pin which is fixed to the bridge and may be regarded as a part thereof.

In all cases my rollable members are arranged in annular form to serve as a bearing for a pivot member, or tubular extension fixed with the finger piece lever or directly for the finger piece lever itself.

I claim:

1. In an eyeglass mounting, the combination with a bridge having a pivot hole which extends into but not through it, of a finger piece lever having a tubular extension forming a pivot member which enters such pivot hole, a plurality of rollable members arranged in such pivot hole in annular form to serve as a bearing for the finger piece lever tubular extension, and a pin which passes through the bridge and the lever to hold the parts in revoluble relation.

2. In an eyeglass mounting, the combination with a bridge having a pivot hole, of a finger piece lever having a tubular extension forming a pivot member which enters such pivot hole, a plurality of rollable members arranged in annular form to serve as a bearing for the finger piece lever tubular extension, and means for holding the parts in revoluble relation.

3. In an eyeglass mounting, the combination with a bridge having a pivot hole, and a plurality of rollable members arranged in annular form therein, of a pivot member revoluble in such rollable members, a finger piece lever carried by the pivot member and revoluble therewith, and means for holding the parts in revoluble relation.

4. In an eyeglass mounting, the combination with a bridge, a finger piece lever pivotally carried thereby, and a retaining member, of a plurality of rollable members arranged in annular form which serve as a bearing for the finger piece lever.

5. In an eyeglass mounting, the combination with a bridge, and a finger piece lever pivotally carried thereby, of a plurality of rollable members between the bridge and lever which serve as a bearing for the finger piece lever.

6. In an eyeglass mounting, the combination with a bridge having a pivot hole, of a pivot member, a finger piece lever carried by the pivot member and revoluble therewith, a plurality of rollable members arranged in annular form to serve as a bearing for the pivot member, and means for holding the parts in revoluble relation.

7. In an eyeglass mounting, the combination with a bridge having a pivot hole, and a plurality of rollable members arranged in annular form therein, of a finger piece lever having a tubular extension revoluble with the rollable members as a bearing, and a retaining pin which passes through such tubular extension.

In testimony whereof I have affixed my signature.

EDGAR J. MARTEL.

Copies of this patent may be obtained for five cents each, by addressing the "Commissioner of Patents, Washington, D. C."